United States Patent [19]

Girard et al.

[11] Patent Number: 4,730,250

[45] Date of Patent: Mar. 8, 1988

[54] LOCAL AREA NETWORK PROCESSING SYSTEM

[75] Inventors: Donald J. Girard; Frank Hines, both Cambridge, Ohio

[73] Assignee: NCR Corporation, Dayton, Ohio

[21] Appl. No.: 772,226

[22] Filed: Sep. 3, 1985

[51] Int. Cl.[4] .................. G06F 15/16; H04Q 9/00; H04J 3/02

[52] U.S. Cl. .................. 364/200; 370/85; 340/825.5

[58] Field of Search ........... 364/200, 900, 130, 131, 364/133, 136; 370/85, 16, 92, 93, 94; 340/825.5, 825.51

[56] References Cited

U.S. PATENT DOCUMENTS

| | | | |
|---|---|---|---|
| 4,034,346 | 7/1977 | Hostein | 364/200 |
| 4,063,220 | 12/1977 | Metcalfe et al. | 340/825.5 |
| 4,151,590 | 4/1979 | Azegami | 364/131 |
| 4,200,930 | 4/1980 | Rawlings et al. | 364/200 |
| 4,301,525 | 11/1981 | Mohammadioun et al. | 364/200 |
| 4,307,446 | 12/1981 | Barton et al. | 364/200 |
| 4,380,761 | 4/1983 | Boggs | 340/825.5 |
| 4,412,326 | 8/1983 | Limb | 340/825.5 |
| 4,464,658 | 8/1984 | Thelen | 370/16 |
| 4,472,712 | 9/1984 | Ault et al. | 370/85 |
| 4,486,826 | 12/1984 | Wolff et al. | 364/200 |
| 4,620,278 | 10/1986 | Ellsworth et al. | 364/200 |
| 4,651,316 | 3/1987 | Kocan et al. | 370/85 |

OTHER PUBLICATIONS

IBM Technical Disclosure Bulletin, vol. 23, No. 2, Jul. 1980, New York (US) Guinlan: "Non-Polled Service Request Identification Method and Apparatus for Magnetic Disk Drives", pp. 731-732.
WO, A 8500486 (Kocan), 31 Jan. 1985, see p. 9, lines 15-28; p. 23, lines 23-37; p. 29, lines 1-15; FIGS. 1,5.
WO, A 8303178 (Ault) 15 Sep. 1983, see p. 3, lines 24-36; p. 4, lines 1-23; p. 7, lines 1-5; p. 19, lines 12-30; p. 20, lines 27-37; p. 21, line 1; FIGS. 1,7,8.

Primary Examiner—Thomas M. Heckler
Assistant Examiner—Joseph T. FitzGerald
Attorney, Agent, or Firm—Wilbert Hawk, Jr.; Albert L. Sessler, Jr.; Richard W. Lavin

[57] ABSTRACT

A data processing system in which a host processor is connected to a plurality of remote processing devices over a common communication channel in which a number of the remote processors are commonly connected to a transceiver for transmitting and receiving data over the communication channel. Switching members on each of the remote processing devices select a pair of communication lines coupled to a priority resolving circuit for transmitting request to send signals and receiving clear to send signals, thereby enabling the remote processing devices to transmit and receive data over the communication channel.

9 Claims, 9 Drawing Figures

LOCAL AREA NETWORK PROCESSING SYSTEM

BACKGROUND OF THE INVENTION

The present invention is directed to a data processing system and more particularly to a local area network communication system which includes a plurality of processing devices connected to a common communication channel for transferring data between the devices.

With the advent of low cost data processing devices such as personal computers, data terminals, etc., local communication networks have been developed to handle a large number of processing devices that may be used within a local business environment. In attaching the processing devices to the common communication channel in the network, a separate tap box for each device has been utilized. As the number of processing devices are added to the network, it has been found that because of noise reflections from within the channel and generated by the number of devices attached to a single tap box, some of the devices are unable to transmit or receive data over the communications channels due to the noise environment present at their location on the channel.

It is therefore a principal object of this invention to provide an apparatus for attaching a number of processing devices to a common communication channel which eliminates any noise interference from other processing devices attached to the channel.

It is another object to this invention to provide an apparatus for attaching a number of processing devices to a common communication channel which reduces the number of tap boxes normally required thereby reducing the cost of the system.

SUMMARY OF THE INVENTION

In order to fulfill these objects, there is disclosed a local area network processing system in which a plurality of processing devices are coupled to a common transceiver member which in turn is connected to the communication channel through a single tap box. Switch means mounted on each of the processing devices and coupled to the transceiver are selectively actuated to connect the processing device to the transceiver member over a separate communication line. The communication lines connected between the transceiver and a number of processing devices also extend through a priority resolving device which arbitrarily selects one of the contending processing devices for access to the transceiver when two or more of the processing devices request to send data over the communication channel at the same time.

BRIEF DESCRIPTION OF THE DRAWINGS

Additional advantages and features of the present invention will become apparent and fully understood from a reading of the following description, taken together with the annexed drawings, in which.

DESCRIPTION OF THE PREFERRED EMBODIMENT

Figure 1:
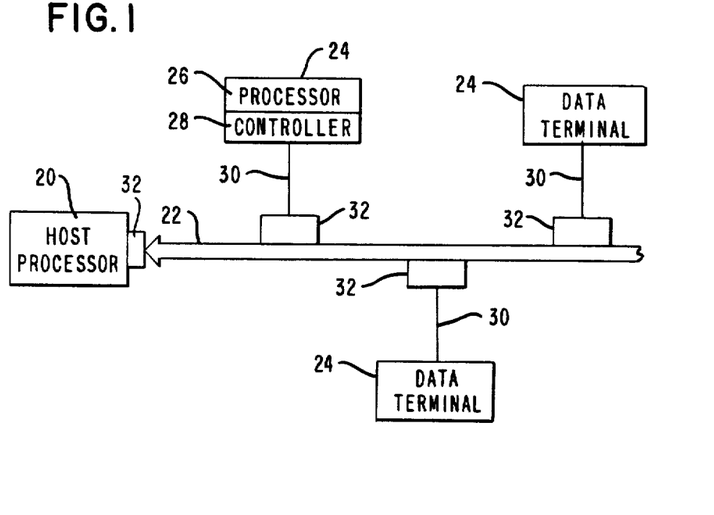
FIG. 1 is a block diagram of a data processing system in which the present invention is incorporated.
Figure 2:
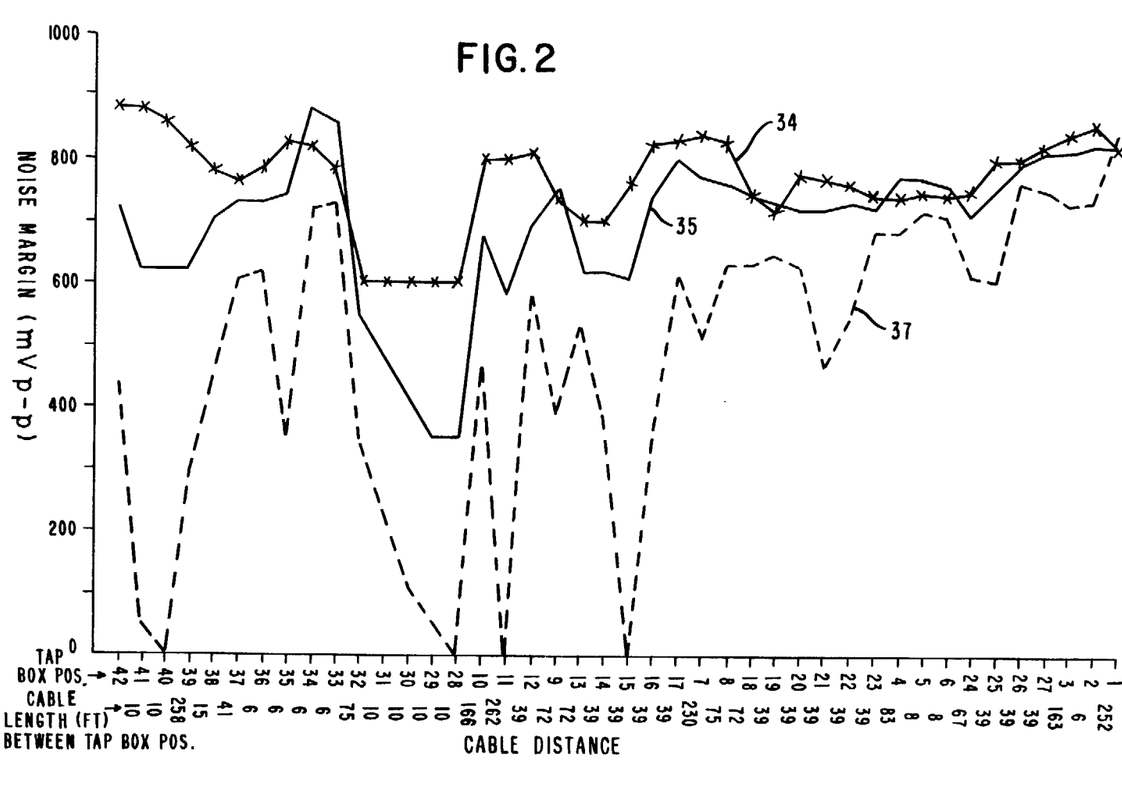
FIG. 2 is a graph illustrating the noise level which is found along the communication channel.

Referring now to FIG. 1, there is shown a schematic representation of a data processing system in which a host processor 20 is connected over a communication channel 22 to a plurality of processing devices 24 such as data terminals which may include a processor chip 26 and a communication controller chip 28 for controlling the transfer of data between the processor chip 26 and the host processor 20 in a manner that is well known in the art. The controller chip 28 is connected to the communication channel 22 by means of a communication line 30 and a tap box 32. As the number of processing devices 24 connected to the channel increases, it has been found that impedance matching becomes critical. Shown in FIG. 2 is a graph disclosing the noise margin that a processing device can tolerate with respect to its location on the communication channel. The graph illustrates that as the number of processing devices connected to the channel by means of a single tap box increases, the noise margin that can be tolerated by a processing device decreases at certain locations along the communication channel preventing the device from communicating over the channel. Curve 34 represents the noise margin existing along the communication channel where a single processing device is connected through the tap box 32 to the communication channel 22. Curve 35 represents two processing elements utilizing a separate tap box while curve 37 represents three processing devices utilizing a separate tap box. As will be described more fully hereinafter, this problem has been overcome by utilizing a single communication controller connected to the communication channel through a single tap box for controlling up to four or more processing devices in which each of the processing devices is coupled to the communication controller through a selected communication line by means of a switch member.

Figure 3:
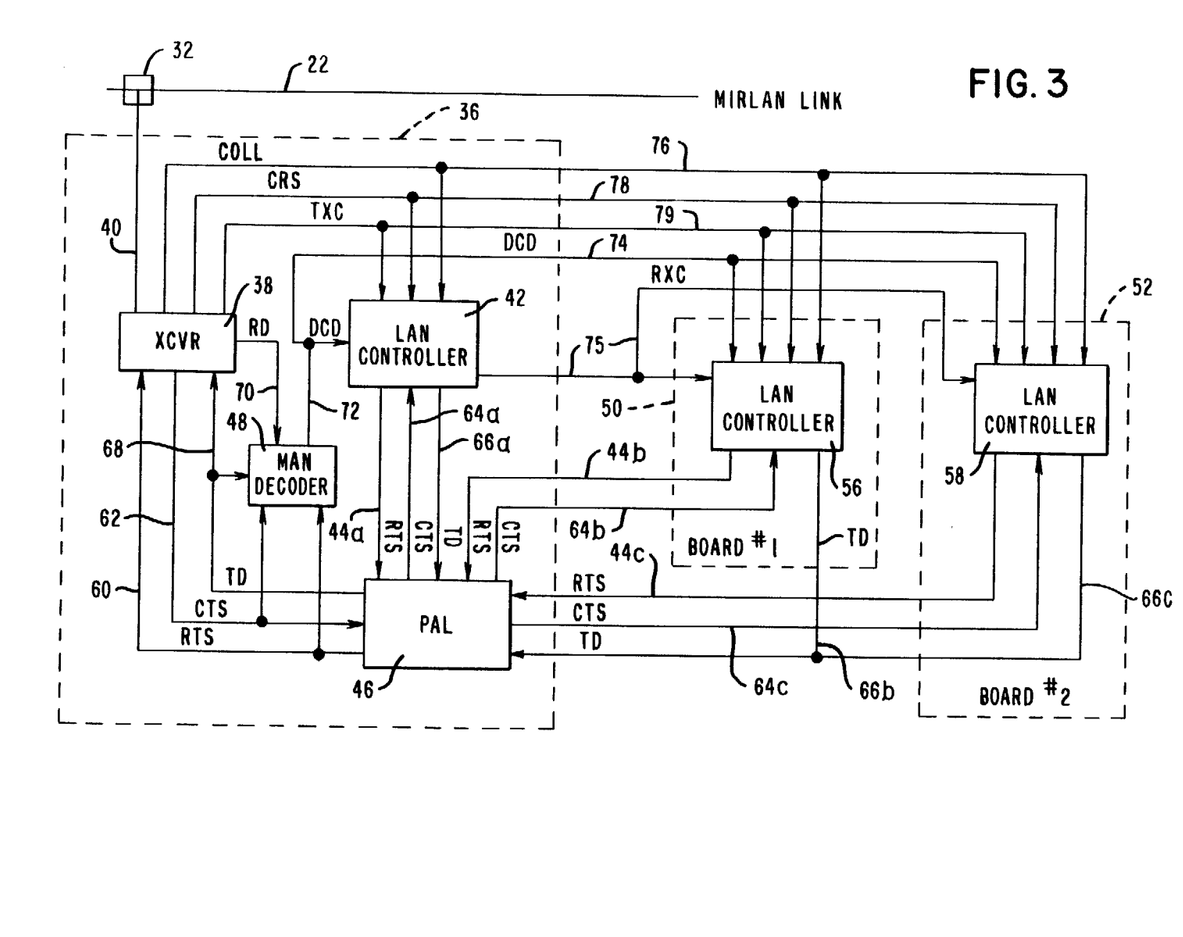
FIG. 3 is a block diagram of a processing device found in a data terminal employing the present invention.

Referring now to FIG. 3 there is shown a block diagram of a plurality of processing devices such as printed circuit boards which may be found in a data device 24 (FIG. 1). Included is a local area network (LAN) printed circuit board 36 which includes a transceiver circuit 38 coupled over line 30 to the tap box 32 for connection to the communication channel 22. Further included in the board 36 is a LAN controller circuit 42 for generating a request to send (RTS) signal over line 44a whenever data from the keyboard of the terminal device (not shown) is to be transmitted to the host processor 20 in a manner that is well known in the art.

Further included on the board 36 is a programmable logic array (PAL) circuit 46 which, as will be described more fully hereinafter, resolves contention when two or more of the processing chips associated with the transceiver circuit 38 attempt to transmit data to the host processor 30 at the same time. PAL is a registered trademark of Monolithic Memories Inc. of Santa Clara, Calif. Also included on the board 36 is a logic circuit 48 which includes a Manchester decoder circuit (not shown) for decoding the received data (RD) in a manner that is well known in the art.

In addition to the board 36, there are two other printed circuit boards associated with the transceiver circuit 38. A second board 50 is included which is interfaced with a printer (not shown) associated with the data terminal device while the board 52 is associated with modem apparatus (not shown). The board 50 includes a LAN controller circuit 56 similar to that of the LAN circuit 42 while the board 52 includes a similar LAN circuit 58. Each of the LAN circuits 42, 56 and 58 will output the RTS signals over lines 44a, 44b, and 44c respectively to the PAL circuit 46 whenever they have data which is to be transferred to the host processor. As will be described more fully hereinafter, the PAL circuit 46 will resolve contention if two or more of the LAN circuits have raised the RTS signal at the same time. In response to receiving the RTS signals, the PAL circuit 46 will raise the signal RTS over line 60 to the transceiver circuit 38.

When the transceiver circuit 38 is able to transmit data over the communication channel 22 to the host processor 20 (FIG. 1), a clear to send (CTS) signal is generated over line 62 to the PAL circuit 46 which will then transmit the CTS signal over one of the lines 64a 64b, or 64c to the particular LAN circuit that was given permission to send data to the host processor 20. The transmitted data (TD) which is Manchester encoded by one of the LAN controllers 42, 56 or 58 is then outputted over one of the lines 66a, 66b, or 66c from the selected LAN circuit through the PAL circuit 46 and over line 68 to the decoder circuit 48. The Manchester decoder circuit 48 decodes the encoded data. The decoded data (DCD) (FIG. 3) is then transmitted over line 74 to the LAN controllers 42, 56 and 58 and also to the transceiver circuit 38 from which the encoded data is outputted over line 40 through the tap box 32 and over bus 22 to the host processor. The PAL circuit 46 is capable of processing two communication channels, one of which is shown in FIG. 3 with each channel capable of supporting up to four LAN circuits.

When the transceiver circuit 38 receives data from the host processor 20 for transmission to one of the LAN circuits 42, 56 or 58 or from the PAL circuit 46, the received data (RD) is transmitted over line 70 to the circuit 48 where the received Manchester encoded data is decoded. The decoded data (DCD) is then transmitted over line 72 to the LAN circuit 42 and also over line 74 to the LAN circuits 56 and 58 for acceptance by the designated circuit. The decoder circuit 48 will output over line 75 a received data clock (RXC) to the LAN circuits 42, 56 and 58 for synchronizing the data that is transmitted to the circuits. If in outputting data over bus 22, the transceiver circuit 38 detects that another processing device on the bus 22 is also attempting to transmit data over the bus, the transceiver circuit 38 will then output the signal COLL (collision) over line 76 notifying the selected LAN circuit to stop trying to send data at this time.

If the transceiver circuit 38 detects data coming over the bus 22, the signal carrier sense signal (CRS) is raised over line 78 to each of the LAN circuits 42, 56 and 58 notifying the circuits to get ready to receive a message in a manner that is well known in the art. The transceiver circuit 38 also outputs a transmit clock signal (TXC) over line 79 to each of the LAN circuits for use in synchronizing the transmission of the data from the circuits.

Figure 4:
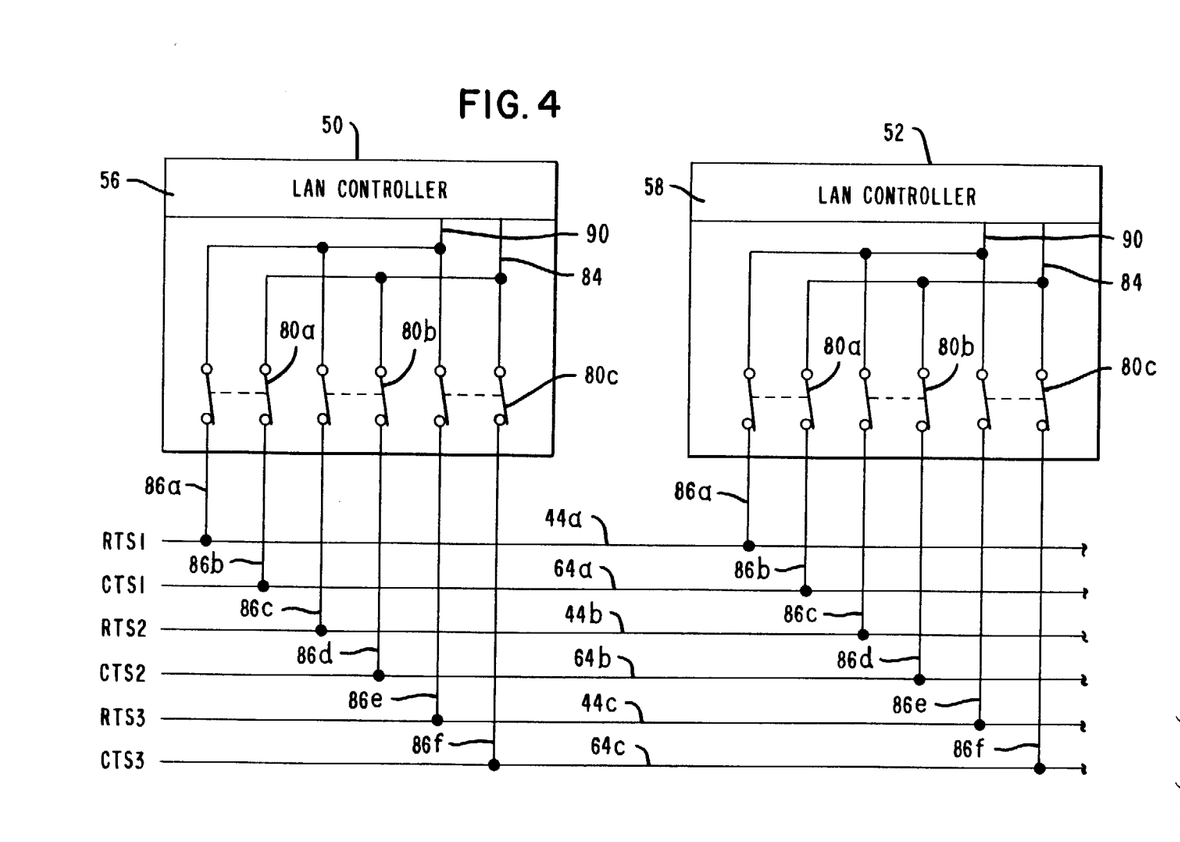
FIG. 4 is a schematic representation of the switches for controlling the coupling of a processing device to the priority resolving device.
Figure 5:
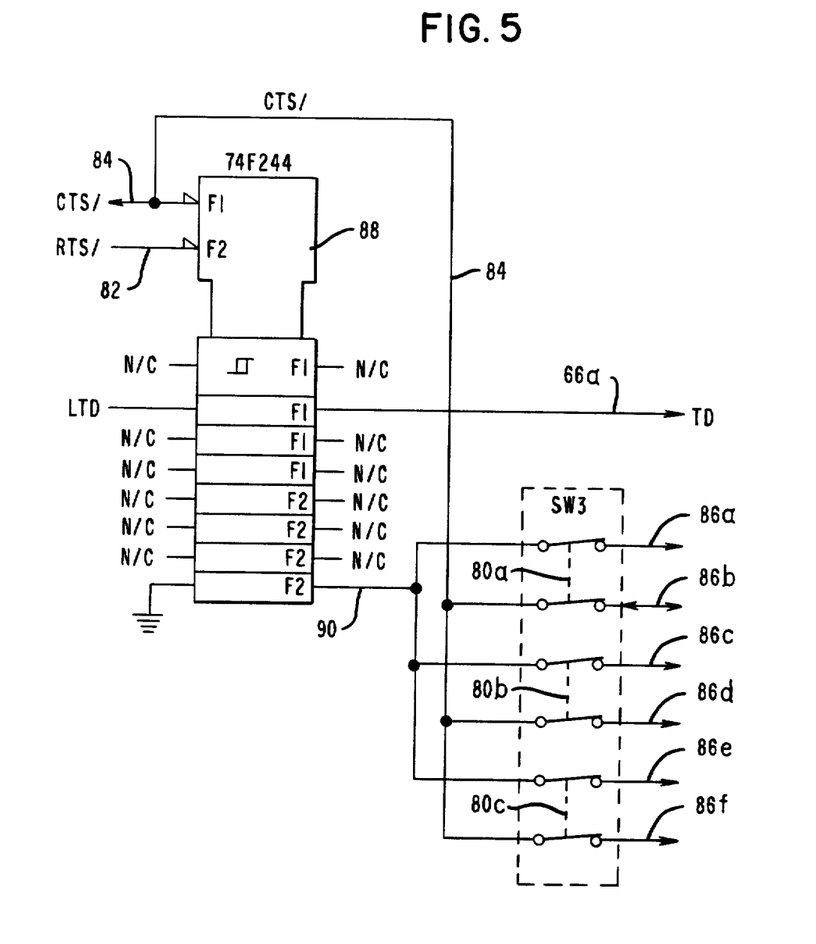
FIG. 5 is a schematic representation of the switching arrangement associated with each processing device.

Referring now to FIGS. 4 and 5, there are shown the switch members found on each of the LAN circuits 56 and 58 (FIG. 3). Since a data terminal device 24 (FIG. 1) can be updated in the field by adding other processing systems or scale which requires the addition of a LAN controller, the PAL circuit 46 must be able to accommodate up to three LAN controller circuits. As the PAL circuit 46 has only one pair of communication lines over which the signals RTS and CTS are transmitted between the circuit 46 and the transceiver circuit 38, each of the connecting lines 44a, 44b, 44c, 64a, 64b, and 64c associated with the circuit 46 must be connected to a separate LAN circuit. To ensure that this is the case, each of the LAN circuits 56 and 58 includes a plurality of switches 80a, 80b, and 80c for connecting the RTS line 82 (FIG. 5) and the CTS line 84 found within each of the LAN circuits to one of the output lines 86a–86f inclusive. Thus, when the LAN circuits 56 and 58 are installed, the switches are manually actuated so that each of the LAN circuits are connected through one of the switches 80a–80c inclusive to a separate RTS and CTS line. The active low required to send signal RTS/appearing on line 82 (FIG. 5) is transmitted through a 74F244 buffer circuit 88 and over line 90 to the switches 80a–80c inclusive. The active low clear to send signal CTS/ is transmitted over line 84 from the switches 80a–80c inclusive. The transmitted data signal LTD appearing on line 66a–66c inclusive is also buffered by the circuit 88 and outputted over line 66a as the data signal TD.

Figure 6:
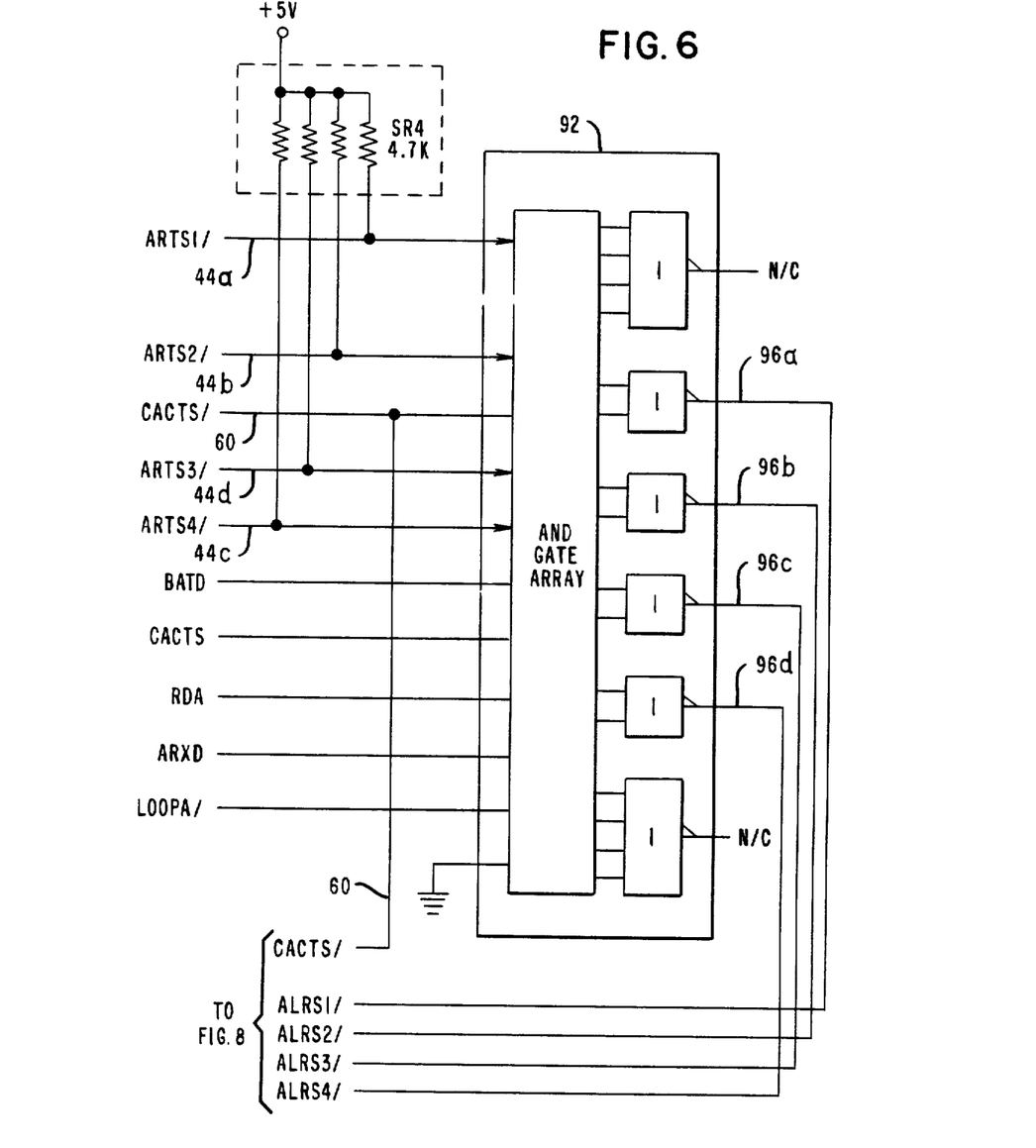
FIG. 6 is a schematic representation of the portion of the programmable logic array unit showing the control signals associated with the first output control channel.
Figure 7:
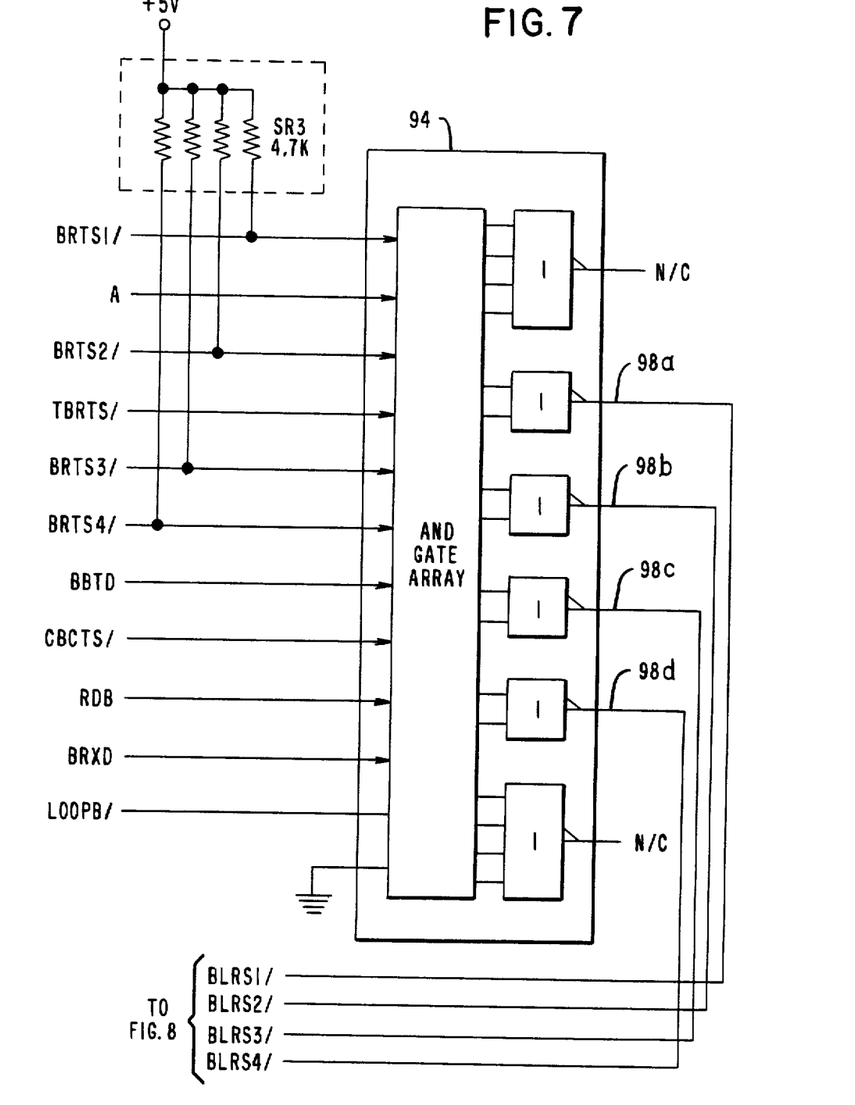
FIG. 7 is a schematic representation of a portion of the programmable logic array unit showing the control signals associated with the second output control channel.
Figure 8:
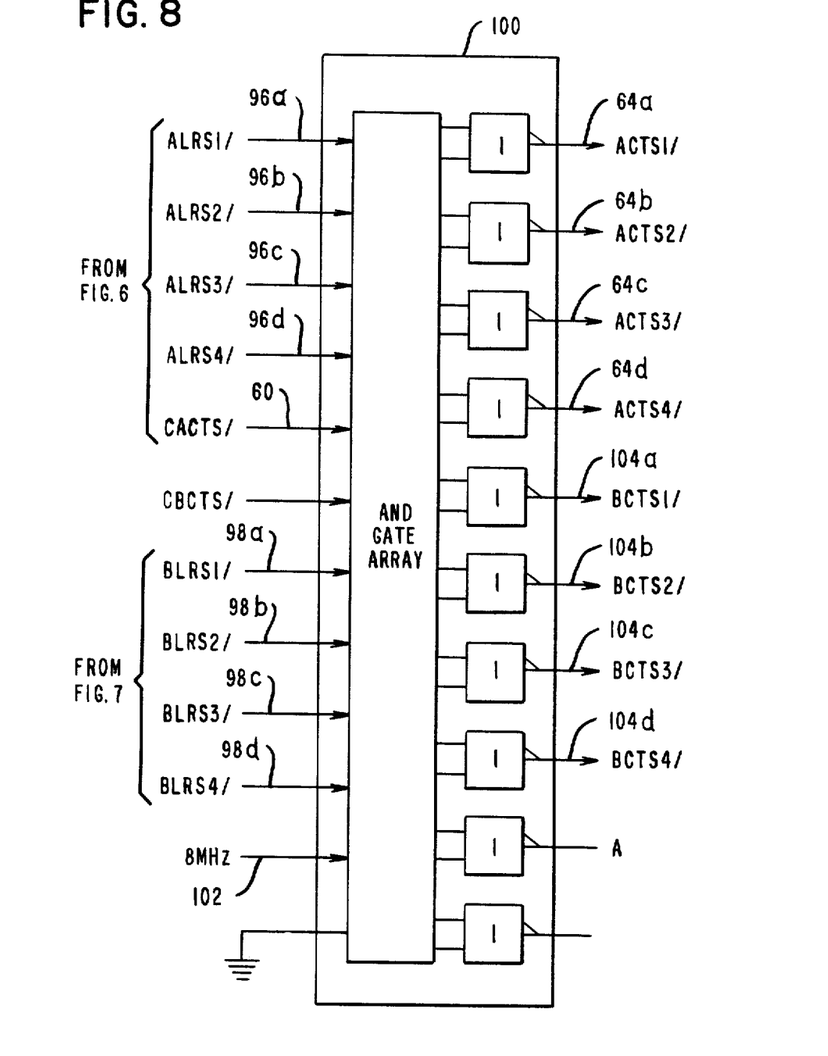
FIG. 8 is a schematic representation of a portion of the programmable logic array unit showing the output signals generated by the logic unit.

Referring now to FIGS. 6, 7 and 8, there is shown a portion of a logic circuit of the PAL circuit 46 (FIG. 3). Included in the circuit are a pair of 16R6 programmable array logic circuits 92 (FIG. 6) and 94 (FIG. 7) which are commercially available from Monolithic Memories Inc. of Santa Clara, Calif. The PAL circuit 46 (FIG. 3) can accommodate two communication channels, channel A and channel B, with channel A shown in FIG. 3. The priority resolving circuit 92 receives the channel A request to send signals ARTS1/, ARTS2/, ARTS3/, ARTS4/, from the LAN circuits shown in FIG. 3 while the circuit 94 receives the channel B request to send signals BRTS1/, BRTS2/, BRTS3/, and BRTS4/, from a second set of LAN circuits (not shown) similar to those shown in FIG. 3. The circuits 92 and 94 are configured in accordance with the following Boolean equations which illustrate the signals on Channel A (FIG. 6);

$$ALRS1 = /ARTS4 \times ARTS1$$

$$ALRS2 = ARTS2 \times /ARTS1$$

$$ALRS3 = ARTS3 \times /ARTS2 \times /ARTS1 + ARTS4 \times ARTS3 \times ARTS1$$

$$ALRS4 = ARTS4 \times /ARTS3 \times /ARTS2 + ARTS4 \times /ARTS3 \times ARTS1$$

The contention circuits 92 and 94 will generate an active low signal over one of the output lines 96a-96b inclusive (FIG. 6) and 98a-98b inclusive (FIG. 7) selecting one of the requests to send signals for transmission to a 12L10 programmable array circuit 100 (FIG. 8) which is commercially available from Monolithic Memories Inc. of Santa Clara, Calif. The circuit 100 receives 8 Mhz clock signals over line 102 from a clock generator (not shown) and will output one of the clear to send signals ACTS1/-ACTS4/inclusive over lines 64a-64c inclusive (FIG. 3) to the selected LAN circuit enabling that circuit to start transmitting data over one of the line 66a-66c inclusive. In a similar manner, the circuit 100 will output one of the clear to send signals BCTS1/-BCTS4/inclusive over lines 104a-104d inclusive of the second communication channel to the selected LAN circuit associated with the channel. The circuit 100 is configured in accordance with the following Boolean equations where the prefix A represents the signals on Channel A and the prefix B represents the signals on $$ACTS1 = ALRS1 \times CACTS$$

$$ACTS2 = ALRS2 \times CACTS$$

$$ACTS3 = ALRS3 \times CACTS$$

$$ACTS4 = ALRS4 \times CACTS$$

$$BCTS1 = BLRS1 \times CBCTS$$

$$BCTS2 = BLRS2 \times CBCTS$$

$$BCTS3 = BLRS3 \times CBCTS$$

$$BCTS4 = BLRS4 \times CBCTS$$

$$ACLK = OCS \times /CACTS$$

$$BCLK = OCS \times /CBCTS.$$

Figure 9:
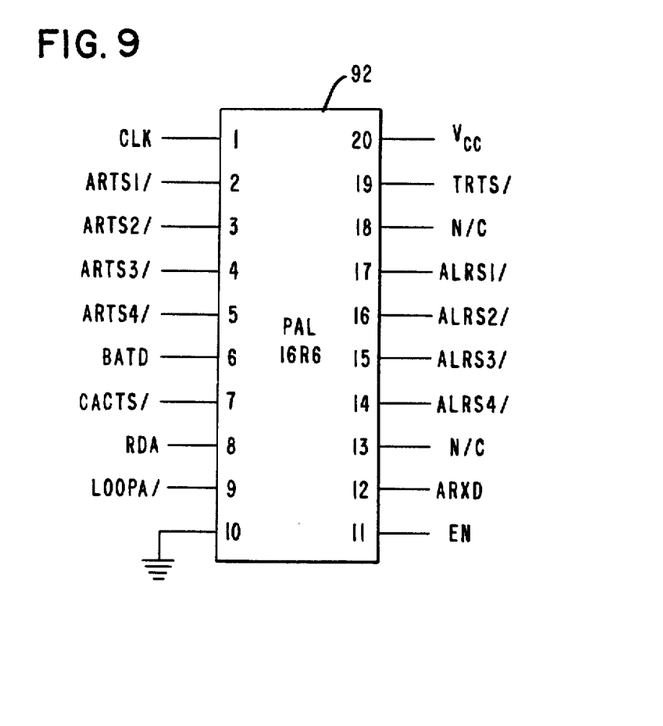
FIG. 9 is a plan view of the programmable logic array unit.

A plan view of the chip pertaining to the circuit 92 (FIG. 6) is shown in FIG. 9.

While the form of the invention shown and described herein is adapted to fulfill the objects primarily stated, it is to be understood that it is not intended to confine the invention to the forms or embodiments disclosed herein for it is susceptable of the embodiment in various other forms within the scope of the appended claims.

What is claimed is:

1. A data processing system for transmitting data between a first processing device and a plurality of remote processing devices including:

a communication channel coupled to said first processing device;

means coupled to said communication channel over a first communication line;

priority resolving means coupled over a second communication line to said transmitting means for transmitting data to said transmitting means and coupled over a plurality of third communication lines to each of said remote processing devices for outputting a first control signal over one of said third communication lines to one of said remote processing devices enabling said remote processing device to transmit data to said priority resolving means over another of said third communication lines whereby said priority resolving means will transmit the received data over said second communication line to said transmitting means; and means coupled between each of said remote processing devices and each of said third communication lines for selectively connecting said one of said third communication lines to its associated remote processing device enabling said associated remote processing device to receive said first control signal from said priority resolving means and connecting said another of said third communication lines to its associated remote processing device enabling the remote processing device to transmit data to the priority resolving means whereby the priority resolving means will transmit the data over said second communication line to said transmitting means.

2. The processing system of claim 1 in which each of said remote processing devices includes controller means connected to said third communication lines for outputting data over its said another of said third communication lines and generating a second control signal requesting authority for its associated remote processing device to transmit data to said first processing means, said selectively connecting means including a first switch member for selectively connecting said controller means to a further one of said third communication lines whereby the second control signal is transmitted to said priority resolving means over the selected further one of said third communication lines.

3. The processing system of claim 2 in which said selectively connecting means includes a second switch member coupling said controller means to said one of said third communication lines enabling said controller means to receive said first control signal enabling said controller means to transmit data to said first processing means.

4. The processing system of claim 3 in which said first and second switch members are manually set to selectively connect their associated third communication lines to their associated remote processing devices.

5. The processing system of claim 4 in which said selectively connecting means includes a third switch member coupling said controller means to said another of said third communication lines enabling said controller means to transmit data to said priority resolving means in response to receiving said first control signal.

6. A data processing system comprising:

a host processing device;

a plurality of remote processing devices;

a communication channel coupled to said host processing device;

a transmitter member coupled to said communication channel for transmitting data to said host processing device;

a priority resolving circuit coupled to said transmitter member and to each of said remote processing devices for outputting data to said transmitter member received from one of said remote processing devices for transmission to said host processor and for outputting a first control signal to said one of said remote processing devices enabling said one of said remote processing devices to transmit data to said priority resolving circuit;

a plurality of communication lines coupled between said priority resolving circuit and each of said remote processing devices;

each of said remote processing devices including a communication controller connected to each of said communication lines for outputting data over a first of said communication lines for transmission to said priority resolving circuit; and a plurality of manually actuated switching means mounted on each of said remote processing devices for selectively coupling its associated communication controller to each of said communication lines enabling said communication controller to receive said first control signal over a second of said communication lines and to transmit data to said priority resolving circuit over said first of said communication lines in response to receiving said first control signal over said second of said communication lines.

7. The data processing system of claim 6 in which said switching means includes a first switch member selectably settable to a position connecting its associated communication controller to a third of said communication lines, said communication controller outputting a second control signal over said selected third of said communication lines requesting authority to transmit data to said priority resolving circuit.

8. The data processing system of claim 7 in which said switching means includes a second switch member selectably settable to a position connecting its associated communication controller to said second of said communication lines enabling said communication controller to receive said first control signal over said selected second of said communication lines.

9. The data processing system of claim 8 in which said switching means includes a third switch member selectively settable to a position connecting its associated communication controller to said one of said communication lines enabling said comnunication controller to transmit data to said priority resolving circuit.

* * * * *